United States Patent [19]

McArthur

[11] 4,069,591
[45] Jan. 24, 1978

[54] ELASTOMERIC INCLINOMETER

[75] Inventor: Billy W. McArthur, Wallis, Tex.

[73] Assignee: Sperry-Sun, Inc., Sugar Land, Tex.

[21] Appl. No.: 666,796

[22] Filed: Mar. 15, 1976

[51] Int. Cl.² .................. G01C 9/06; G01L 1/22; H01L 10/10

[52] U.S. Cl. ..................... 33/312; 33/366; 338/2; 338/46

[58] Field of Search ............... 33/304, 312, 313, 366; 338/2, 46, 114; 73/517 R, DIG. 4, 141 A

[56] References Cited

U.S. PATENT DOCUMENTS

| 2,078,616 | 4/1937 | Smith et al. | 73/517 R |
|---|---|---|---|
| 2,193,910 | 3/1940 | Wilson | 73/517 R |
| 3,033,043 | 5/1962 | Runft | 73/DIG. 4 |
| 3,167,049 | 1/1965 | Foster | 33/366 |
| 3,372,386 | 3/1968 | Klinger | 33/366 |
| 3,719,913 | 3/1973 | DuBose et al. | 338/2 |
| 3,791,043 | 2/1974 | Russell | 33/312 |

OTHER PUBLICATIONS

Sensotec Division of Scientific Advances, Inc. Advertising brochure.

*Primary Examiner*—Steven L. Stephan
*Attorney, Agent, or Firm*—Macka L. Murrah

[57] ABSTRACT

Information as to borehole inclination is provided by a pendulum in combination with an elastomeric material whose resistance varies with compression. The pendulum is arranged in a housing to compress the elastomer whenever the housing deviates from the vertical, or other predetermined attitude. The change in resistance is measured by a circuit including an ohmmeter and the pendulum and elastomer as conductive elements.

13 Claims, 6 Drawing Figures

ELASTOMERIC INCLINOMETER

BACKGROUND OF THE INVENTION

Field of the Invention

The invention relates to remote measurement of angles, and more particularly to measurement of the courses of boreholes and the attitude of tools in boreholes for purposes of surveying and controlled drilling.

Technical Considerations

Surveying is the determination of certain aspects of the course of a borehole during drilling or after it has been drilled or partially drilled. Surveying is used both in connection with controlled and uncontrolled drilling as will be hereinafter defined. Surveys are of two types: (1) inclination and directional. An inclination survey determines only the angle that the borehole makes with the gravity vertical at any particular depth (known variously as "inclination", "dip angle", "pitch angle" or "drift"), while a directional survey provides not only the inclination of the borehole but also the azimuthal direction in which a deviated borehole points at any particular depth (also known as "orientation").

Inclination surveys are used in several situations. They mau be used to determine approximate true vertical depth since inclination is a measure of the deviation from a perfectly vertical hole. This may be desirable in order to locate a perpendicular geological formation relative to hole depth or to insure that a hole does not exceed a critical degree of inclination that may fatigue drill pipe.

Directional surveys are important for several reasons in addition to those outlined for inclination surveys. They are useful, for example, in determining hole location for legal trespass purposes and the location of the hole with respect to certain geological conditions, such as faults. Directional surveys are also essential for controlled drilling as will be discussed below.

Controlled drilling is drilling that which is manipulated in order to insure that the hole will be straight and/or reach a predetermined destination. Both controlled and uncontrolled drilling are operated upon by forces that tend to randomly direct the course of a borehole away from the straight course. Variations in hardness of formations can cause the course to wander since the drill bit seeks the path of least resistance. Borehole courses are also affected by the reactive torque produced by a rotating drill bit, which tends to produce a spiral hole. Taken together, these forces can cause even a "straight" borehole to wander far from its expected or intended course and bottom out at a location that cannot be predicted.

Controlled drilling is used to drill both vertically and directionally. Vertical drilling seeks to drill a borehole as nearly vertical and straight as possible, while directional drilling seeks to drill a borehole to some predetermined point below the earth's surface and horizontally displaced from the surface location.

Both types of controlled drilling require directional survey information, since, in order to assure that the intended hole destination is reached, it is necessary to know the present bottom hole location and where the hole is tending. The bottom hole position with respect to the top hole position can be calculated from inclination and direction readings taken as the survey tool is lowered into the borehole. The latter information is, of course, obtained from the final reading of the survey.

Vertical drilling may be used, for example, to drill a borehole on a small piece of property without trespassing onto adjoining property. Directional drilling is employed for drilling borehole that cannot be located directly above the desired completion point and for redrilling wells where a correction in the existing course of the well is necessary or desirable.

New wells may be directionally drilled for a number of reasons, the primary of which is economics. One example of this is found in drilling wells from offshore platforms. It is a common practice to build a large drilling platform that is permanently secured to the ocean floor and from which a multiplicity of wells are drilled. Because of the number of wells that are drilled from a single platform, it is necessary to drill the holes laterally from the platform so that earth formations containing petroleum reservoirs may be penetrated at desired locations. This procedure permits production from as great an area as possible by equipment located on a single platform.

Other reasons are environmental and aesthetic. In urban areas it may be desirable to group a number of wells together and camaflouge them to disrupt the appearance of the area as little as possible; and around lakes and other bodies of water, it is preferably to drill to underlying petroleum bearing formations from onshore.

Additional types of drilling for which directional drilling is used are boreholes to reach areas under salt dome overhangs, boreholes around objectionable locations such as where the surface topography makes drilling at an angle from a lower location preferable to deeper drilling through a hill, relief wells for bringing burning or blown-out wells under control and boreholes drilled at an angle into a formation to give greater production area.

Directional drilling may be used in re-drilling existing wells to correct excessive drift and direction, to straighten the well, to prevent trespass, to side-track lost tools, to direct the course toward the productive side of a fault, to direct a well back into a hole that has caved in and been lost and to direct a hole away from edge water into the productive zone.

Drilling is controlled using two methods: (1) conventional and (2) steering. Conventional directional drilling is a blind process in which a hole section is begun in a particular attitude and drilled for a time thereafter without knowledge of its instantaneous attitude. Steering, on the other hand, is a continuous process in which the attitude of the hole is continuously measured in order that course corrections may be continuously made. Steering is a technique that it used in connection with the mud motor drilling system, in which the drill pipe remains stationary and the drill is rotated by a mud turbine or moyno motor operated by high pressure drilling mud supplied from the surface. Deflecting capability is provided by a deflection tool known as a "bent sub," which is a bent section of drill pipe at the lower end of the drill string near the drill bit. The primary determinent of the angle at which the bit address the formation is the degree of bend of the bent sub. The plane of the angle established by the bent sub is known as the "tool face." The high side always defines a line that projects laterally out from the main section of a deviated borehole. This direction is the direction of the "tool face." In order to turn the hole, the entire drill string is merely rotated at the surface to point the bent sub in a different lateral direction.

Attitude information necessary for steering differs somewhat from survey information. Survey information is concerned with the course of the hole up until the present moment. This includes both the inclination and direction of the borehole. Steering information, on the other hand, is concerned only with attitude in which the bent sub points. To steer a hole to a desired location, however, it is necessary to have both survey and steering information.

Steering requires information as to the relative angular position of the tool face in the borehole (known as "roll") in order to properly direct the course of the mud motor drill established by the bent sub. While inclination is generally referenced to the gravity vertical and direction to magnetic north, the reference for roll differs depending upon hole inclination. The inclination and direction planes never change, but the roll plane changes with tool inclination and direction. Thus, while inclination is always referenced to the gravity vertical and direction to magnetic north, roll can be and is referenced to either. The one selected generally depends upon hole inclination. For "low angle holes", i.e., holes departing very little from the vertical and having a small inclination angle, steering is generally based on magnetic bearing. In "high angle holes" having large inclination angles, the hole may be near the plane in which magnetic bearings are taken, and consequently another reference must be found. In this situation, steering is generally based on a "roll angle," which is the angle between the high side of the hole and a reference point on the tool.

Prior Art

There are four generaly types of attitude indicating devices: (1) gyroscopic, (2) inertial, (3) magnetic and (4) gravity. Gyroscopic devices utilize the direction-maintaining characteristic of a rotating body, while inertial devices, such as accelerometers, sense changes in direction by the principle of inertia. Magnetic devices generally use Electrical devices usually detect a change in current flow. U.S. Pat. No. 3,791,043 to Russell discloses making and breaking an electrical connection by a mercury pendulum switch and a resistive type strain gauge. U.S. Pat. No. 3,862,499 to Isham discloses sensing a change in the current necessary to keep a magnetic accelerometer in a predetermined position. In U.S. Pat. No. 3,407,508 to Baskir, a current is modulated by magnetic coils.

U.S. Pat. No. 3,622,971 to Arps discloses a spherical compass having three contacts on the face thereof and connected in an electrical circuit to three resistors. Whenever a measurement is desired, the compass is clamped, connecting the contacts to a series of longitudinal, electrically conductive rings above the compass. The inclination and direction are determined by the relative resistances provided by the contacts. U.S. Pat. No. 3,718,194 discloses a photoelectric sensor in which a pendulum rotates between a light source and a photocell; and U.S. Pat. No. 2,365,999 to Boucher discloses a light source whose beam is directed to or from a vertical position by a pendulum. The light beam travels through a circular shutter and is detected by a photocell, which transmits a signal to the surface. The shutter rotates and has an opening that increases in width nearer the shutters edge. The larger the angle of inclination, the nearer the light beam points to the edge of the shutter, and the longer the photocell produces a signal.

Attitude sensing devices operate generally in either a drilling interrupt or a while-drilling mode. Generally speaking, only the devices employed electrical or magnetic sensing can be used in the while-drilling mode. This is due to the necessity of transmitting the data up the drill string to the surface, and, even though the actual transmission may be other than electrical or magnetic (acoustical, for example), an electrical sensor-transducer is generally required. The photographic and mechanical sensing devices operate only in the interrupt mode since it is necessary to remove these devices from the borehole to inspect the information that they have generated. The while-drilling mode has the obvious advantage of decreasing total drilling time since drilling and sensing may be done simultaneously.

SUMMARY OF THE INVENTION

In accordance with the invention, a novel attitude sensing device uses a pendulum as its attitude indicating element. The pendulum is positioned adjacent an elastomeric, variably resistive material. The elastomeric material is connected in an electrical circuit that contains a current detecting device. Alternatively, the circuit may include the pendulum as an element. The elastomeric material is positioned closely enough to the pendulum that small deviations from the vertical of the housing bring the pendulum into contact with the elastomeric material. As the pitch of the housing increases, the force applied by the pendulum to the elastomeric material increases up to a pitch angle of 90°. The varying force on the elastomeric material decreases the resistance of the elastomeric material in a predictable manner such that the magnitude of the current flowing in the circuit as indicated by the current detecting device is an indication of the pitch of the housing.

BRIEF DESCRIPTION OF THE DRAWINGS

These and other features and advantages of the present invention will become apparent from reading the following detailed description of one embodiment thereof when taken in conjunction with the drawings, wherein.

DETAILED DESCRIPTION

Figure 1:
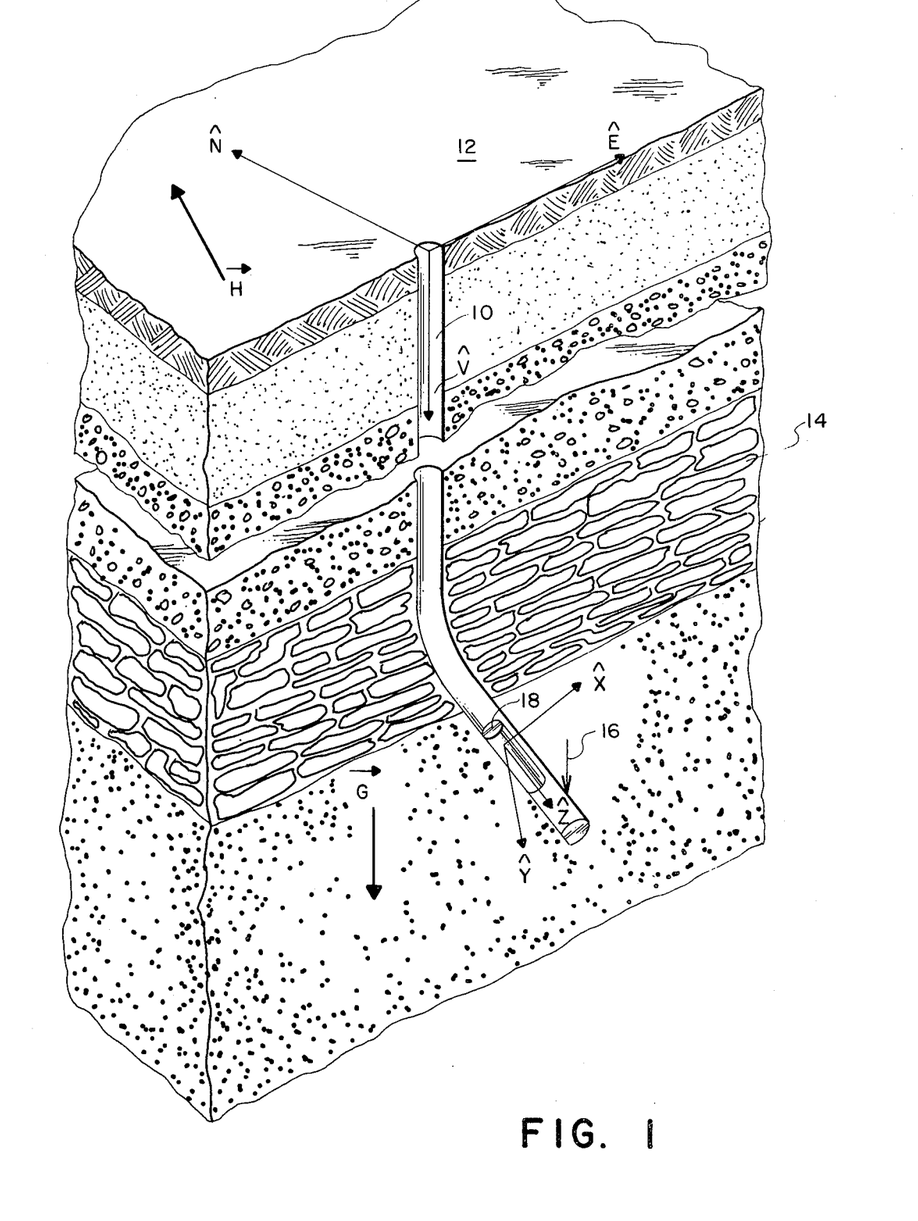
FIG. 1 is a cross-section of a typical directionally drilled borehole showing earth and instrument reference axes.

Referring to FIG. 1, a typical embodiment in which the invention may be used is shown. A borehole 10 commences at the earth's surface 12 and traverses subsurface formations 14. The borehole may begin vertical, but for a variety of reasons, both intentional and accidental, the hole may vary from the vertical direction.

The borehole may be referenced to a rectangular coordinate system as follows: $\hat{N}$ defined by a line directed from the center of the borehole toward magnetic north; $\hat{E}$ defined by a similar line to magnetic east; and V defined by similar line directed downward. These may be called earth axes.

The invention may be embodied in an angle measuring tool 18 that may be positioned in the bottom of the borehole with its axis coinciding with the axis of the borehole. The instrument orientation may be referenced to a rectangular coordinate system having axes as follows: $\hat{x}$ perpendicular to the instrument axis and in the direction of some predetermined point on tool 18; $\hat{y}$ perpendicular to the instrument axis and the $\hat{x}$ axis; and $\hat{z}$ in the downward direction along the instrument axis. These may be called instrument axes. Also shown in FIG. 1 are the earth's magnetic vector $\vec{H}$ and the earth's gravity vector $\vec{G}$, both of which may be related to the earth axes and the instrument axes.

The central idea of remote attitude sensing is to relate the attitude of the instrument axes to the attitude of the earth axes. One way in which this can be done is to measure the magnitude of a certain parameter along an axis or axes in each coordinate system and relate the differences in the magnitude along respective axes to an angular rotation. It is known that these values vary trigonometrically, and thus a particular difference in magnitude corresponds to a particular angular difference. In the coordinate system described above, the magnitude in the $\hat{x}$-axis is compared to that in the $\hat{N}$-axis, the $\hat{y}$-axis to the $\hat{E}$-axis and the $\hat{z}$-axis to the $\hat{V}$-axis.

The coordinate systems can be related by means of three vector rotations as illustrated in FIGS. 1A to 1D in which the earth's axes are rotated into the instrument axes. The first rotation is along the $\hat{V}$-axis through the "azimuth angle" $\psi$ to define a first intermediate coordinate system $\hat{N}_1$-$\hat{E}_1$-$\hat{V}$. Next rotation is along the $\hat{E}_1$ axis through the "pitch angle" $\theta$ to define a second intermediate coordinate system $\hat{N}_2$-$\hat{E}_1$-$\hat{z}$. The last rotation is along the $z$ axis through the "high side angle" $\phi$ into $\hat{x}$, $\hat{y}$, $\hat{z}$ coordinate system.

From standard classical mathematics of coordinate transformation, the relationship between any vector $\vec{Axo}$ in the earth axes and the same vector $\vec{Ax}$ in the instrument frame is:

$$\vec{Axo} = [B] \cdot \vec{Ax} \qquad (1)$$

where $[B]$ is a three by three matrix defined by the three rotations as follows:

$$[B] = \begin{bmatrix} \cos\psi & -\sin\psi & 0 \\ \sin\psi & \cos\psi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} \cos\phi & -\sin\phi & 0 \\ \sin\phi & \cos\phi & 0 \\ 0 & 0 & 1 \end{bmatrix}$$

$$= \begin{bmatrix} (\cos\psi\cos\theta\cos\phi - \sin\psi\sin\phi) & (-\cos\psi\cos\theta\sin\phi - \sin\psi\cos\phi) & (\cos\psi\sin\theta) \\ (\sin\psi\cos\theta\cos\psi + \cos\psi\sin\phi) & (-\sin\psi\cos\theta\sin\phi + \cos\psi\cos\phi) & (\sin\psi\sin\theta) \\ (-\sin\theta\cos\phi) & (\sin\theta\sin\phi) & (\cos\theta) \end{bmatrix} \qquad (2)$$

Alternately, $$\vec{Ax} = [B]^{-1} \cdot \vec{Axo} \qquad (3)$$

For conformal transformations $[B]^{-1} = [B]^*$ where $[B]^{-1}$ is the inverse of $[B]$, and $[B]^*$ is the transpose of $[B]$. Thus, $$\vec{Ax} \begin{bmatrix} (\cos\psi\cos\theta\cos\phi - \sin\psi\sin\phi) & (\sin\psi\cos\theta\cos\phi + \cos\psi\sin\phi) & (-\sin\theta\cos\phi) \\ (-\cos\psi\cos\theta\sin\phi - \sin\psi\cos\phi) & (-\sin\psi\cos\theta\sin\phi + \cos\psi\cos\phi) & (\sin\theta\sin\phi) \\ (\cos\psi\sin\theta) & (\sin\psi\sin\theta) & \cos\theta \end{bmatrix} \cdot \vec{Axo}$$

The parameters most conveniently measured for purposes of transformation of axes are the earth's gravity and magnetic fields, $\vec{G}$ and $\vec{H}$, respectively.

The gravity vector referred to the earth axes is:

$$\vec{G} = \begin{bmatrix} 0 \\ 0 \\ -g \end{bmatrix} \qquad (5)$$

and the gravity vector referred to the instrument axes is:

$$\vec{G} = \begin{bmatrix} g_x \\ g_y \\ g_z \end{bmatrix} \qquad (6)$$

then:

$$\begin{bmatrix} g_x \\ g_y \\ g_z \end{bmatrix} = [B]^{-1} \cdot \begin{bmatrix} 0 \\ 0 \\ -g \end{bmatrix} \qquad (7)$$

which then multiplied out gives:

$$\begin{bmatrix} g_x \\ g_y \\ g_z \end{bmatrix} = \begin{matrix} g\sin\theta\cos\phi & (8) \\ -g\sin\theta\sin\phi & (9) \\ -g\cos\theta & (10) \end{matrix}$$

If the horizontal and vertical components of the earth's magnetic are $H_h$ and $H_v$, respectively, then the field vector referred to the earth axes is:

$$\vec{H} = \begin{bmatrix} H_h \\ 0 \\ -H_v \end{bmatrix} \qquad (11)$$

If the field vector referred to the instrument axes is:

$$\vec{H} = \begin{bmatrix} h_x \\ h_y \\ h_z \end{bmatrix} \qquad (12)$$

then:

-continued $$\begin{bmatrix} h_x \\ h_y \\ h_z \end{bmatrix} = [B]^{-1} \cdot \begin{bmatrix} H_n \\ 0 \\ -H_v \end{bmatrix} \quad (13)$$

which when multiplies out gives:

$$h_x = H_n\cos\psi\cos\theta\cos\phi - H_n\sin\psi\sin\phi + H_v\sin\theta\cos\phi \quad (14)$$

$$h_y = H_n\cos\psi\cos\theta\sin\phi - H_n\sin\psi\cos\phi - H_v\sin\theta\sin\phi \quad (15)$$

$$h_z = H_n\cos\psi\sin\theta - H_v\cos\theta \quad (16)$$

The parameters $g$, $H_n$ and $H_v$ are known from prior measurements at each location on the earth's surface; and $g_x$, $g_y$, $g_z$, $h_x$, $h_y$ and $h_z$ may be measured by tool 18 and associated sensors (not illustrated). Knowing these, the angles $\psi$, $\theta$ and $\phi$ can be calculated using known mathematical techniques. Alternatively, only one or several of these parameters may be measured, and calculations may be made from selected equations. For example, if only $g_z$ is measured, only equation 10 need be used.

Figures 2, 3A, 3B:
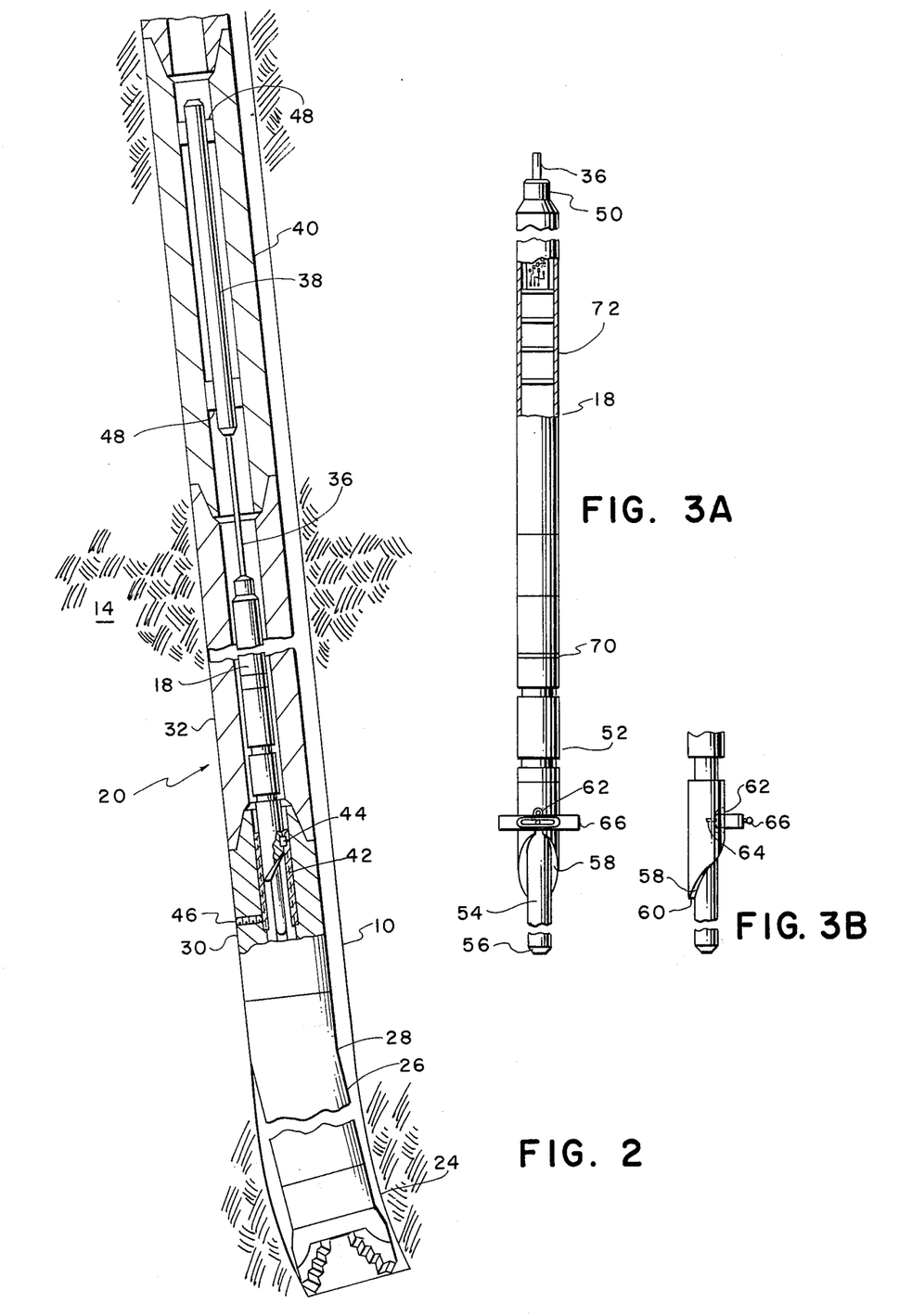
FIG. 2 is a cross-section of a directional drilling apparatus that includes attitude sensing apparatus.
FIGS. 3A and 3B are views of the attitude sensing tool shown in FIG. 2.

Referring to FIG. 2, the angle measuring tool 18 may be positioned in the lower end of a drill string 20 in the borehole 10. The drill stem includes a rotatable drill bit sub 24 positioned below a mud motor 26 in a bent sub. The particular drilling system shown is operated by a hydraulic mud motor apparatus in which only the drill bit rotates rather than the entire drill string rotating as in a rotary drilling system. In the mud motor system, the drill bit is rotated by movement of pressurized mud, which is injected into the drill string 20 at the surface, through mud motor 26.

Bent sub 28 is used to perform directional drilling. The direction of the borehole 10 can be changed by rotating drill stem 20 to reestablish the plane in which bent sub 28 points.

Above bent sub 28, the drill stem includes a muleshoe orienting sub 30, and a drill collar 32. An angle measuring tool 18 is positioned within the interior bore of the drill collar 32 and is connected to a conductor cable 36 at its upper end. The conductor cable carries signals generated in tool 18 either to the surface or to an acoustical transmitter tool 38, or the like, in a transmitter sub 40, which is positioned above drill collar 32. The remainder of drill stem 20 above transmitter sub 40 may be made up of conventional drill pipe sections.

Muleshoe orienting sub 30 includes a muleshoe sleeve 42 positioned within its interior bore in a predetermined orientation. Sleeve 42 is held in the predetermined orientation with the sub by means of a screw, or the like, 46 extending through the sidewall of sub 30. Muleshoe sleeve 42 has a key 44 positioned in its sidewalll and extending inwardly into its interior bore. The muleshoe sleeve and its key are normally aligned with respect to the deflection plane of the bent sub. This predetermined alignment of the muleshoe key with respect to the deflection plane of the bent sub is convenient for purposes of determining the position of the drill bit with respect to the surface indications of hole deflection and providing compensating changes therein, although other alignment techniques could also be used. Muleshoe sleeve 42 has longitudinal slots (not shown) formed therein which provide a mud circulating bypass through the sleeve when a tool is positioned therein.

Acoustical transmitter 38 is secured in transmitter sub 40 by webs 48. An electro-acoustical transducer inside transmitter 38 (not shown) generates acoustical signals in response to signals generated in angle measuring tool 18. The acoustical signals are coupled into sub 40 of drill stem 20 through webs 48, and they travel along the drill stem to the surface where they are received and interpreted. For deep holes acoustical repeaters may be placed at periodic intervals along the drill stem to compensate for attenuation of the signals.

Referring to FIGS. 3A and 3B, angle measuring tool 18 is connected by an adapter 50 to conductor cable 36. A muleshoe 52 is secured to the lower end of the tool string. The muleshoe includes a protruding shaft 54 having a tapered end 56 for guiding shaft 54 into muleshoe sleeve 42 (FIG. 2). A beveled shoulder 58 extends around opposite sides of protruding portion 54 meeting at a pointed terminal 60. On the opposite side of the tool, the beveled portions 58 meet to form a longitudinally extending slot 62. Slot 62 is sized to receive inwardly extending key 44 (FIG. 2) on the muleshoe sleeve 42 when the tool is positioned in the drill pipe. As shown in FIG. 3A a hole 64 extends downwardly in the slot toward the center of the tool. Hole 64 is arranged to receive a leveling device 66 which has a pin depending therefrom for insertion into the hole.

The attitude sensing tool includes a muleshoe adjuster which permits rotation of muleshoe 52 relative to tool string 18. The adjuster includes mating portions, or a T-slot connector (FIG. 4), between muleshoe 52 and toolstring 18 to prevent relative rotation therebetween. It also includes a locking collar 70 for securing tool string 18 and muleshoe 52 in a fixed position.

Figure 4:
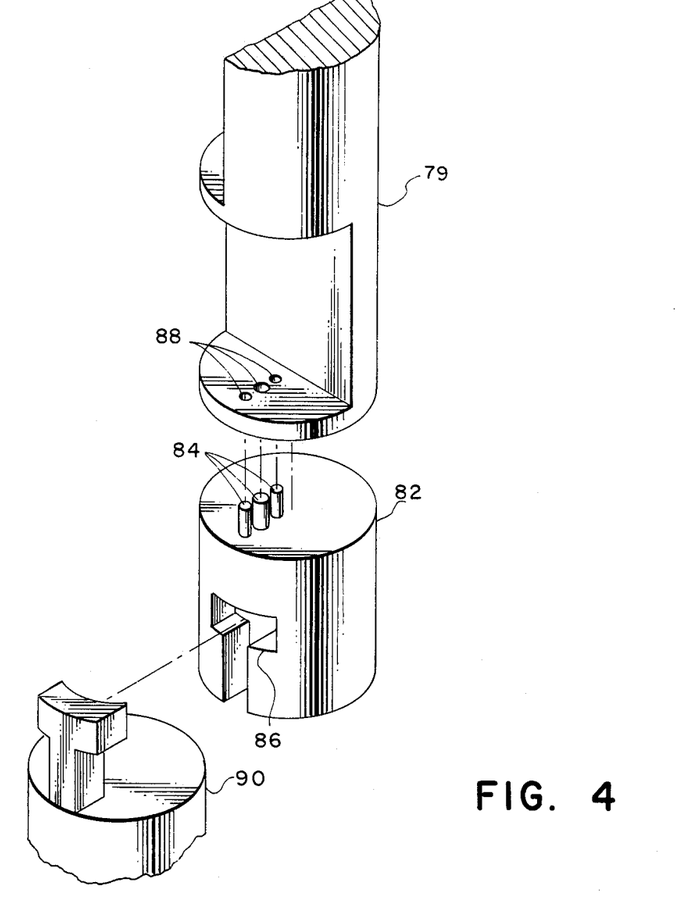
FIG. 4 shows a T-slot connector used in connection with the attitude sensing tool of FIGS. 3A and 3B.

Referring to FIG. 4, the attitude sensing apparatus may be positioned on a chassis, or the like, 80 and inserted into tool string 18. The chassis may be secured in a predetermined orientation with respect to tool string 18 by means of a "T-slot" arrangement as shown in FIG. 4. The lower end of chassis 79 may be positioned upon a female portion 82 of a T-slot connector by means of indexing dowels 84, which fit into indexing holes 88 on chassis 79. Female connector portion 82 has a slot 86 in the form of the letter "T." The slot receives a T-shaped insert when a male portion 90 of the T-slot connection, is positioned above muleshoe 52.

Figure 5:
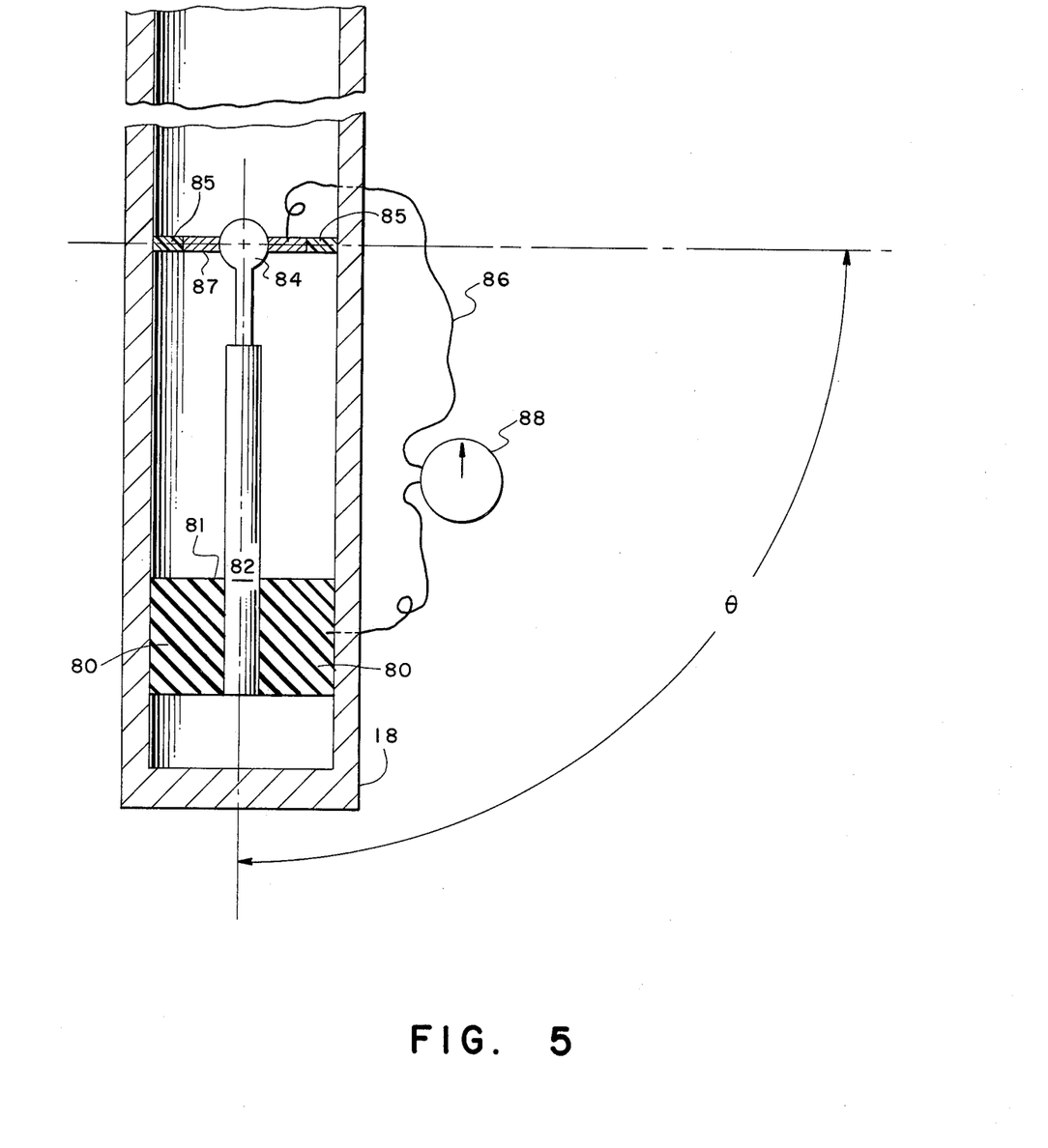
FIG. 5 is a cross-section of the attitude sensing device in accordance with th present invention.

Referring to FIG. 5, the inclination transducer that may be positioned in tool string 18 is shown. Attached to the inside of tool string 18 is a weight 82 that can pivot around a ball 84. Ball 84 is movably connected by means of a ball and socket arrangement to a contact plate 87. Contact plate 87 is attached to tool string 18 to permit weight 82 to be freely suspended therein. Contact plate 87 is electrically insulated from tool string 18 by means of insulation blocks 85.

Weight 82 extends on its lower end through a toroidal piece of elastomer 80, which is attached to the interior walls of tool string 18. Cavity 81 in toroidal elastomer 80 through which pendulum 82 extends is substantially in contact with pendulum 82 on all sides, although for clarity of illustration the size of the space is exaggerated. Elastomer 80 is of the type that changes its resistance as it is compressed. Material of this type is generally chemically treated with a conductive material on the molecular level such that compression of the elastomer increases the amount of contact between conducting molecules which may, for example, be silver. A typical elastomer is that known as "DYNACON C" manufactured by Dynacon Industries, Inc., Leonia, N.J. This elastomer has been found to change from a resistance of 100 megaohm to 0.1 ohms with the application of a pressure of 20 pounds.

Elastomer 80 is connected by means of a conductor 86 through a resistance measuring device 88 to contact plate 87. Information derived by resistance measuring device 88 such as an ohmmeter, may be transmitted to the surface by means previously described.

In the operation of the device of FIG. 5, as the tool string 18 is inclined at an angle $\theta$ from 0° through 90°, weight 82 applies more and more force against the elastomer 80. As this force changes, the electrical resistance between contact plate 87 and weight 82 is changing. This change in resistance is measured by resistance measuring device 88. Since the resistance of elastomer 80 changes as the angle $\theta$ changes, the inclination can be calibrated as a function of resistance of the elastomer.

The invention has been described for use in a single transducer configuration as an inclinometer. It may, however, be used in a three transducer, orthogonal configuration to provide complete attitude information. It may also be used in connection with magnetic sensors, such as fluxgates, to provide further attitude information.

While particular embodiments of the invention have been shown and described, it is apparent that changes and modifications may be made without departing from the true scope and spirit of the invention. It is therefore the intention in the appended claims to cover all such changes and modifications.

What is claimed is:

1. In a borehole surveying apparatus:
    a toroidal elastomer whose resistance varies with compression;
    a pendulum freely suspended and extending through the toroidal elastomer such that when the apparatus is in a predetermined attitude the pendulum does not compress the elastomer and as said apparatus is inclined from the predetermined attitude said pendulum compresses the elastomer; and
    circuitry for detecting the change in the resistance of said elastomer.

2. Apparatus in accordance with claim 1 wherein the detecting circuitry includes the pendulum and the elastomer as conductive elements.

3. Apparatus for sensing the inclination of a borehole, comprising:
    a cylindrical housing for positioning with its axis along the axis of the borehole;
    a toroid comprised of a variably resistive, elastomeric material positioned about the interior of the housing near one end thereof;
    a pendulum attached to the other end of said housing and extending through the center of the toroid,
    said pendulum being sized to be in contact with said toroid on all sides when the axis of said housing is vertical;
    and circuitry for detecting a change in the resistance of said elastomer.

4. Apparatus in accordance with claim 3 wherein the detecting circuitry includes the pendulum and elastomer.

5. Apparatus for sensing the inclination of a borehole, comprising:
    a cylindrical housing for positioning in the borehole;
    a toroid comprised of variably resistive elastomeric material positioned about the interior of the housing;
    a pendulum in said housing and extending through the center of the toroid such that when said housing is in a vertical attitude the pendulum does not compress the elastomeric material and as said housing is inclined from a vertical attitude said pendulum compresses said elastomeric material; and
    means for measuring the resistance of said toroid.

6. Apparatus in accordance with claim 5 wherein the toroid is positioned near one end of the housing and the pendulum is suspended from near the other end.

7. Apparatus in accordance with claim 5 wherein the pendulum is sized to be substantially in contact with said toroid on all sides when the axis of said housing is vertical.

8. An inclinometer, comprising:
    a housing;
    a toroidal-shaped variably resistive, elastomeric material in the housing;
    a pendulum in said housing and extending through the toroidal elastomeric material such that when the housing is in a vertical attitude the pendulum does not compress the elastomeric material and as said housing is inclined from the vertical attitude the pendulum compresses said elastomeric material; and
    circuitry for detecting the change in the resistance of said elastomeric material.

9. An inclinometer in accordance with claim 8 wherein the elastomeric material is in the shape of a toroid.

10. An inclinometer in accordance with claim 9 wherein the pendulum extends through the center of the toroid.

11. The apparatus of claim 8 wherein the detecting circuitry includes the pendulum and the toroid.

12. An inclination transducer, comprising:
    a housing;
    a toroidal-shaped variably resistive, elastomeric material in the housing;
    means in said housing for compressing the elastomeric material by contact as said housing is inclined from a vertical attitude, said means not compressing said elastomeric material when said housing is in a vertical attitude; and
    means for detecting a change in the resistance of said elastomeric material.

13. An inclination transducer in accordance with claim 12 wherein the detecting means includes the pendulum and the elastomeric material.

* * * * *

UNITED STATES PATENT OFFICE
CERTIFICATE OF CORRECTION

PATENT NO. : 4,069,591
DATED : January 24, 1978
INVENTOR(S) : Billy W. McArthur

It is certified that error appears in the above-identified patent and that said Letters Patent are hereby corrected as shown below:

Column 1, line 20, after "and" insert --(2)--.

Column 1, line 27, delete "mau" and substitute therefor --may--.

Column 1, line 30, delete "perpendicular" and substitute therefor --particular--.

Column 1, line 41, delete "that".

Column 2, line 6, delete "borehole" and substitute therefor --boreholes--.

Column 2, line 25, delete "camaflouge" and substitute therefor --camouflage--.

Column 2, line 27, delete "preferably" and substitute therefor --preferable--.

Column 2, line 54, delete "it" and substitute therefor --is--.

Column 2, line 62, delete "address" and substitute therefor --addresses--.

Column 3, line 36, delete "generaly" and substitute therefor --general--.

Column 4, line 5, delete "employed" and substitute therefor --employing--.

UNITED STATES PATENT OFFICE
CERTIFICATE OF CORRECTION

PATENT NO. : 4,069,591
DATED : January 24, 1978
INVENTOR(S) : Billy W. McArthur

It is certified that error appears in the above-identified patent and that said Letters Patent are hereby corrected as shown below:

Column 4, line 56, delete "th" and substitute therefor --the--.

Column 5, line 1, after "by" insert --a--.

Column 7, line 6, delete "multiplies" and substitute therefor --multiplied--.

Column 7, line 53, delete "sidewalll" and substitute therefor --sidewall--.

Signed and Sealed this

Twenty-fifth Day of July 1978

[SEAL]

Attest:

RUTH C. MASON
Attesting Officer

DONALD W. BANNER
Commissioner of Patents and Trademarks

Disclaimer 4,069,591.—*Bill W. McArthur*, Wallis, Tex. ELASTOMERIC INCLINOMETER. Patent dated Jan. 24, 1978. Disclaimer filed Mar. 20, 1978, by the assignee, *Sperry-Sun, Inc.*

Hereby enters this disclaimer to claims 9 and 10 of said patent.

[*Official Gazette September 30, 1980.*]